US010649796B2

(12) United States Patent
Phillips et al.

(10) Patent No.: US 10,649,796 B2
(45) Date of Patent: May 12, 2020

(54) ROLLING RESOURCE CREDITS FOR SCHEDULING OF VIRTUAL COMPUTER RESOURCES

(71) Applicant: Amazon Technologies, Inc., Reno, NV (US)

(72) Inventors: John Merrill Phillips, Seattle, WA (US); William John Earl, Burien, WA (US); Deepak Singh, Issaquah, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 14/331,745

(22) Filed: Jul. 15, 2014

(65) Prior Publication Data

US 2015/0378753 A1    Dec. 31, 2015

Related U.S. Application Data

(60) Provisional application No. 62/018,466, filed on Jun. 27, 2014.

(51) Int. Cl.
*G06F 9/455* (2018.01)
*G06F 9/50* (2006.01)
(Continued)

(52) U.S. Cl.
CPC ............ *G06F 9/455* (2013.01); *G06F 9/4881* (2013.01); *G06F 9/505* (2013.01); *G06F 9/5005* (2013.01);
(Continued)

(58) Field of Classification Search
CPC ............................... G06F 9/5038; H04L 47/72
See application file for complete search history.

(56) References Cited

U.S. PATENT DOCUMENTS 6,714,960 B1 * 3/2004 Bitar ................... G06F 9/4881
718/103
7,093,250 B1 * 8/2006 Rector ................. G06F 9/4881
718/100
(Continued)

FOREIGN PATENT DOCUMENTS

CN        1841331       10/2006
JP     2011198027       10/2011

OTHER PUBLICATIONS

Lee, Min, et al. "Supporting soft real-time tasks in the xen hypervisor." 2010. ACM Sigplan Notices. vol. 45. No. 7. ACM, 2010.*
(Continued)

*Primary Examiner* — Lewis A Bullock, Jr.
*Assistant Examiner* — Gilles R Kepnang
(74) *Attorney, Agent, or Firm* — Robert C. Kowert; Kowert, Hood, Munyon, Rankin & Goetzel, P.C.

(57) ABSTRACT

A network-based virtual computing resource provider may offer virtual compute instances that implement rolling resource credits for scheduling virtual computing resources. Work requests for a virtual compute instance may be received at a virtualization manager. A resource credit balance may be determined for the virtual compute instance. The resource credit balance may accumulate resource credits in rolling fashion, carrying over unused credits from previous time periods. Resource credits may then be applied when generating scheduling instructions to provide to a physical resource to perform the work requests, such as a physical CPU in order to increase the utilization of the resource according to the number of credits applied. Applied resource credits may then be deducted from the credit balance.

20 Claims, 9 Drawing Sheets

(51) Int. Cl.
*G06F 9/48* (2006.01)
*G06Q 20/22* (2012.01)

(52) U.S. Cl.
CPC ........... *G06F 9/5027* (2013.01); *G06Q 20/22* (2013.01); *G06F 9/4843* (2013.01); *G06F 9/5077* (2013.01)

(56) References Cited

U.S. PATENT DOCUMENTS

| | | | |
|---|---|---|---|
| 7,797,699 B2 | 9/2010 | Kagi et al. | |
| 7,937,705 B1 | 5/2011 | Prael et al. | |
| 8,019,861 B2 | 9/2011 | Ginzton | |
| 8,045,563 B2 | 10/2011 | Lee | |
| 8,091,088 B2* | 1/2012 | Kishan | G06F 9/485 718/104 |
| 8,214,835 B2 | 7/2012 | Tsai et al. | |
| 8,397,236 B2* | 3/2013 | Gibson | G06F 9/4881 718/100 |
| 8,429,276 B1* | 4/2013 | Kumar | G06F 9/45533 709/226 |
| 8,695,007 B2* | 4/2014 | Wada | G06F 9/45533 713/300 |
| 8,914,511 B1* | 12/2014 | Yemini | G06Q 10/06 709/226 |
| 8,918,784 B1 | 12/2014 | Jorgensen et al. | |
| 2003/0120914 A1* | 6/2003 | Axnix | G06F 9/5077 713/100 |
| 2004/0267932 A1* | 12/2004 | Voellm | G06F 9/5011 709/226 |
| 2005/0273511 A1* | 12/2005 | Ferreira de Andrade | G06F 9/5027 709/227 |
| 2006/0130062 A1* | 6/2006 | Burdick | 718/100 |
| 2006/0174247 A1* | 8/2006 | Farrell | G06F 9/5027 718/104 |
| 2006/0230400 A1* | 10/2006 | Armstrong | G06F 9/5077 718/1 |
| 2008/0022280 A1* | 1/2008 | Cherkasova | G06F 9/4881 718/102 |
| 2008/0320140 A1* | 12/2008 | Simard | G06F 9/5016 709/226 |
| 2009/0055829 A1* | 2/2009 | Gibson | G06F 9/4881 718/103 |
| 2009/0183164 A1* | 7/2009 | Carlstrom | H04L 47/10 718/103 |
| 2010/0005532 A1* | 1/2010 | Van Steenbergen | G06Q 10/10 726/28 |
| 2010/0146503 A1* | 6/2010 | Tsai | G06F 9/4881 718/1 |
| 2010/0169968 A1* | 7/2010 | Shanbhogue | G06F 9/4812 726/22 |
| 2011/0010721 A1* | 1/2011 | Gupta | G06F 9/5077 718/103 |
| 2011/0035749 A1 | 2/2011 | Krishnakumar et al. | |
| 2011/0035752 A1* | 2/2011 | Krishnakumar | G06F 9/4881 718/103 |
| 2011/0119422 A1* | 5/2011 | Grouzdev | G06F 9/4881 710/262 |
| 2011/0202926 A1* | 8/2011 | Chambliss | G06F 9/5038 718/104 |
| 2012/0054762 A1* | 3/2012 | Moon | G06F 9/5077 718/103 |
| 2012/0216207 A1* | 8/2012 | Krishnakumar | G06F 9/4881 718/103 |
| 2012/0221454 A1* | 8/2012 | Morgan | G06F 9/5027 705/37 |
| 2012/0290348 A1* | 11/2012 | Hackett | G06Q 10/06 705/7.13 |
| 2013/0055279 A1* | 2/2013 | Sistare | G06F 9/50 718/104 |
| 2013/0167146 A1 | 6/2013 | Dong et al. | |
| 2013/0346969 A1* | 12/2013 | Shanmuganathan | G06F 9/4856 718/1 |
| 2014/0013321 A1 | 1/2014 | Laoutaris et al. | |
| 2014/0059551 A1* | 2/2014 | Umanesan | H04L 67/325 718/102 |
| 2014/0137104 A1* | 5/2014 | Nelson | G06F 9/45558 718/1 |
| 2014/0378094 A1* | 12/2014 | Gillick | H04M 15/7652 455/406 |
| 2014/0379924 A1* | 12/2014 | Das | H04L 47/72 709/226 |
| 2015/0007189 A1* | 1/2015 | De Gruijl | G06F 9/5011 718/104 |
| 2015/0339170 A1* | 11/2015 | Guan | G06F 9/4881 718/104 |
| 2016/0196168 A1* | 7/2016 | Koizumi | G06F 9/5077 718/104 |
| 2017/0034068 A1* | 2/2017 | Watts | H04L 12/6418 |

OTHER PUBLICATIONS

Angel, Sebastian, et al. "End-to-end Performance Isolation Through Virtual Datacenters." 2014. OSDI. vol. 14. (Year: 2014).*
U.S. Appl. No. 14/484,197, filed Sep. 11, 2014, William John Earl, et al.
ffice Action from Japanese Application No. 2016-573062, dated Feb. 20, 2018, pp. 1-29.
Office Action from Chinese Application No. 201580034494.8, (English Translation and Chinese Version), Amazon Technologies, Inc., dated Mar. 28, 2019, pp. 1-18.
International Search Report and Written Opinion from PCT/US2015/037443, Amazon Technologies, Inc., dated Oct. 8, 2015, pp. 1-11.
http://wiki.xen.org/wiki/Credit_Scheduler, "Credit Scheduler Xen", Dowloaded Mary 27, 2015, pp. 1-4.

* cited by examiner

ROLLING RESOURCE CREDITS FOR SCHEDULING OF VIRTUAL COMPUTER RESOURCES

RELATED APPLICATIONS

This application claims benefit of priority to U.S. Provisional Application Ser. No. 62/018,466, entitled "Rolling Resource Credits for Scheduling of Virtual Computer Resources," filed, Jun. 27, 2014, and which is incorporated herein by reference in its entirety.

BACKGROUND

The advent of virtualization technologies for commodity hardware has provided benefits with respect to managing large-scale computing resources for many customers with diverse needs, allowing various computing resources to be efficiently and securely shared by multiple customers. For example, virtualization technologies may allow a single physical computing machine to be shared among multiple users by providing each user with one or more virtual machines hosted by the single physical computing machine, with each such virtual machine being a software simulation acting as a distinct logical computing system that provides users with the illusion that they are the sole operators and administrators of a given hardware computing resource, while also providing application isolation and security among the various virtual machines. As another example, virtualization technologies may allow data storage hardware to be shared among multiple users by providing each user with a virtualized data store which may be distributed across multiple data storage devices, with each such virtualized data store acting as a distinct logical data store that provides users with the illusion that they are the sole operators and administrators of the data storage resource.

Virtualization technologies may be leveraged to create many different types of services or perform different functions for client systems or devices. For example, virtual machines may be used to implement a network-based service for external customers, such as an e-commerce platform. Virtual machines may also be used to implement a service or tool for internal customers, such as information technology (IT) service implemented as part of an internal network for a corporation. Utilizing these virtual resources efficiently, however, may require flexible utilization options for many different types of virtual resource workloads. In some environments multiple virtual machines may be hosted together on a single host, creating the possibility for contention and conflicts when utilizing different virtual computing resources that may rely upon the same physical computer resources.

While embodiments are described herein by way of example for several embodiments and illustrative drawings, those skilled in the art will recognize that the embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION

The systems and methods described herein may implement rolling resource credits for scheduling virtual computing resources, according to some embodiments. Different clients implementing virtual computing resources have different resource demands. For example, some clients' workloads are not predictable and may not utilize fixed resources efficiently. Virtual compute instances implementing rolling resource credits for scheduling virtual computing resources may provide dynamic utilization of resources to provide flexible high performance, without wasting unutilized fixed resources. Resource credits are accumulated for individual virtual compute instances. When a virtual compute instance needs to perform work at high performance, the resource credits may be applied to the work, effectively providing full utilization of underlying physical resources for the duration of the resource credits. When a virtual compute instance is using less than its share of resources (e.g., little or no work is being performed), credits may be acquired and used for a subsequent task. Resources may, in various embodiments, be any virtualized computer resource that is implemented or performed by a managed physical computer resource, including, but not limited to, processing resources, communication or networking resources, and storage resources.

Figure 1:
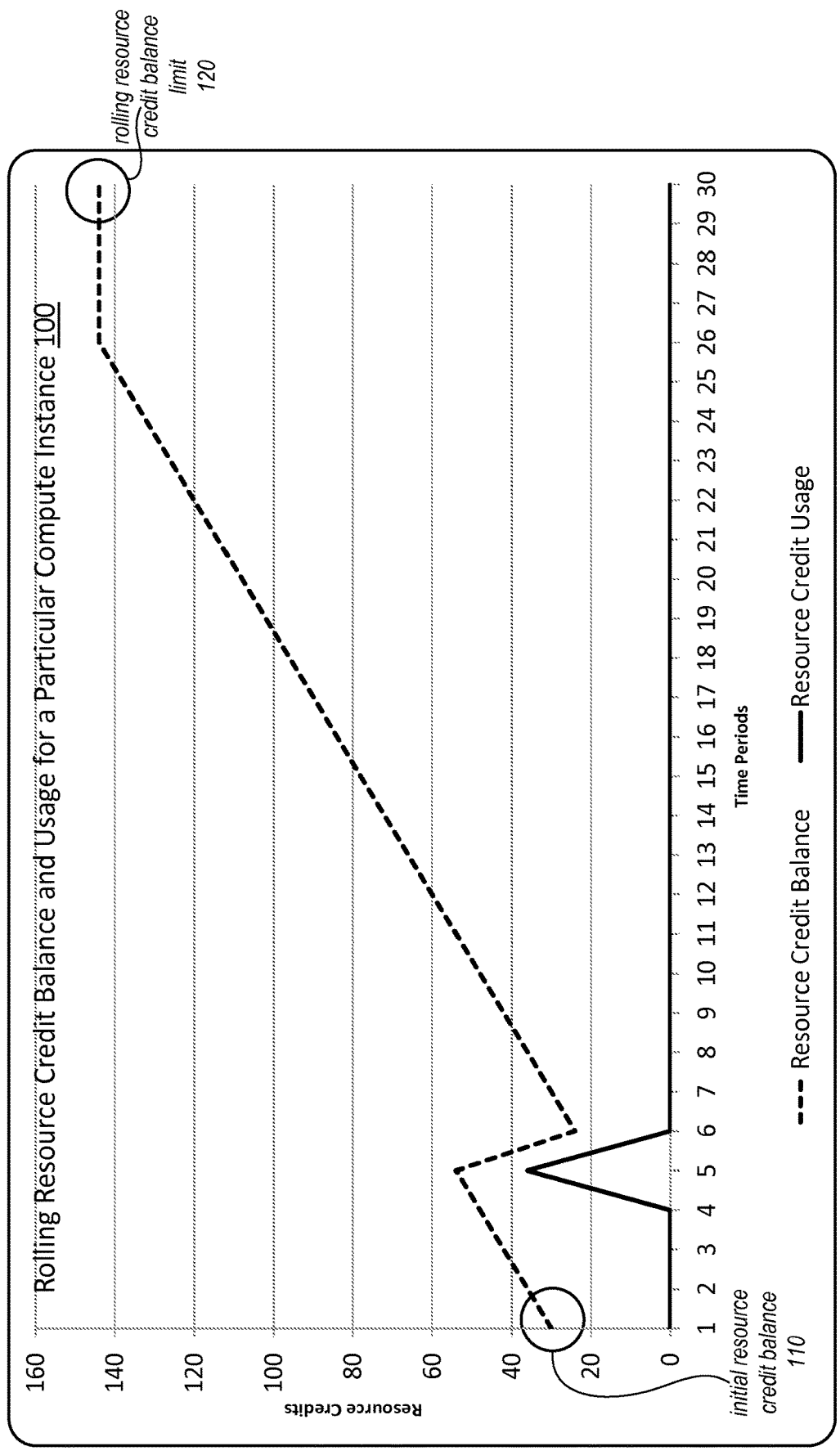
FIG. 1 is a graph illustrating a rolling resource credit balance for a virtual compute instance, according to some embodiments.

Virtual compute instances may implement rolling resource credits for scheduling virtual computing resources, providing for responsiveness and high performance for limited periods of time, and low cost. FIG. 1 is a graph illustrating a rolling resource credit balance for a virtual compute instance, according to some embodiments. Graph 100 illustrates both the resource credit usage and resource credit balance for a compute instance implementing rolling resource credits for scheduling. An initial resource credit balance 110 may be provided (e.g., 30 credits) which may be used immediately. Over time, the compute instance may accumulate more credits until reaching a rolling resource credit balance limit 120, in some embodiments. This limit may be enforced by excluding certain accumulated resource credits after a period of time (e.g., 24 hours). When applied, a resource credit may provide full utilization of a resource for a particular time (e.g., a computer resource credit may equal 1 minute of full central processing unit (CPU) utilization, 30 seconds for a particular networking channel, or some other period of use that may be guaranteed), in some embodiments. Resource credits may be deducted from the resource credit balance when used.

Consuming resource credits, a virtual compute instance may utilize sufficient resources (e.g., CPU cores, network interface card functions, etc.) to obtain high performance when needed. For example, the credit resource usage at time 5 is less than the resource credit balance at time 5. Thus, the work carried out at time 5 was performed with full utilization for the life of the task, as more resource credits in the current resource credit balance were available for consumption than was necessary to perform the task. Moreover, as no further resource credit usage is indicated, the resource credits continue to carry over until reaching the balance limit 120, saving further physical resources for the next heavy usage period (or another work request for another compute instance hosted on the same virtualization host). If no resource credits are available when performing a task, a baseline utilization guarantee may still be applied to perform a work request. In some embodiments, the baseline utilization guarantee may be the amount of time the virtual compute instance can use the resource without spending any credits in the credit resource balance.

In at least some embodiments, the baseline utilization guarantee may correspond to the resource credit accumulation rate. If, for instance, a resource credit is equivalent to one minute full utilization per hour, then a 6 resource credit accumulation rate per hour is equivalent to 6 minutes out of 60 minutes, or 10% utilization of a resource for the hour. In this example, the baseline guarantee may be 10% utilization of a resource for an hour. However, in some embodiments, the resource credit accumulation rate may be independent of the baseline guarantee (e.g., 12 resource credit accumulation rate per hour and a 10% baseline guarantee), allowing a resource credits to accrue to the resource credit balance even if a compute instance submits work requests that utilize the allotted baseline utilization guarantee. Please note that the previous examples are not intended to be limiting to the various ways or combinations that resource credit accumulation rate and baseline performance may be implemented.

Figure 2:
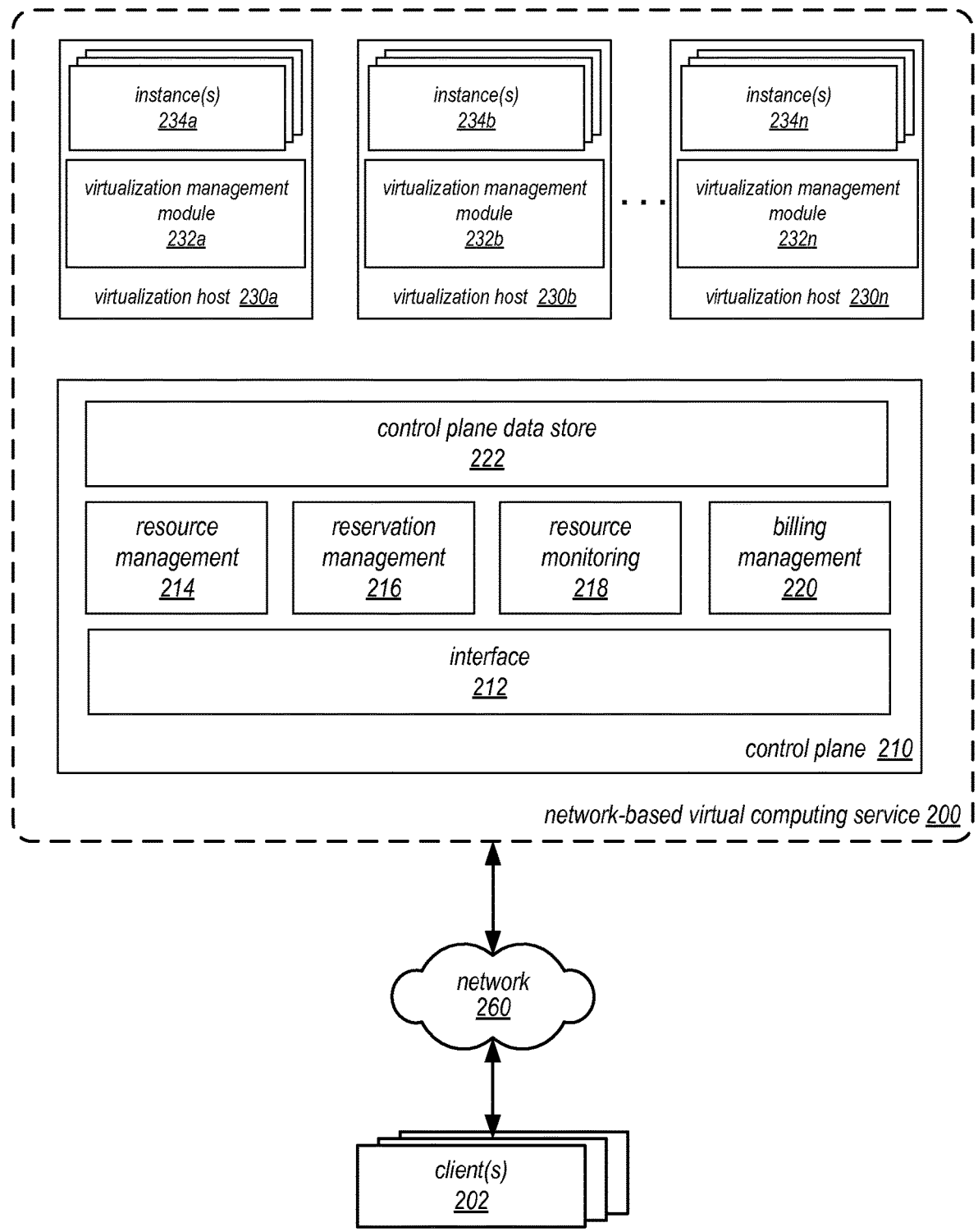
FIG. 2 is a block diagram illustrating a network-based virtual computing service that provides virtual compute instances implementing rolling resource credits for scheduling virtual computer resources, according to some embodiments.
Figure 3:
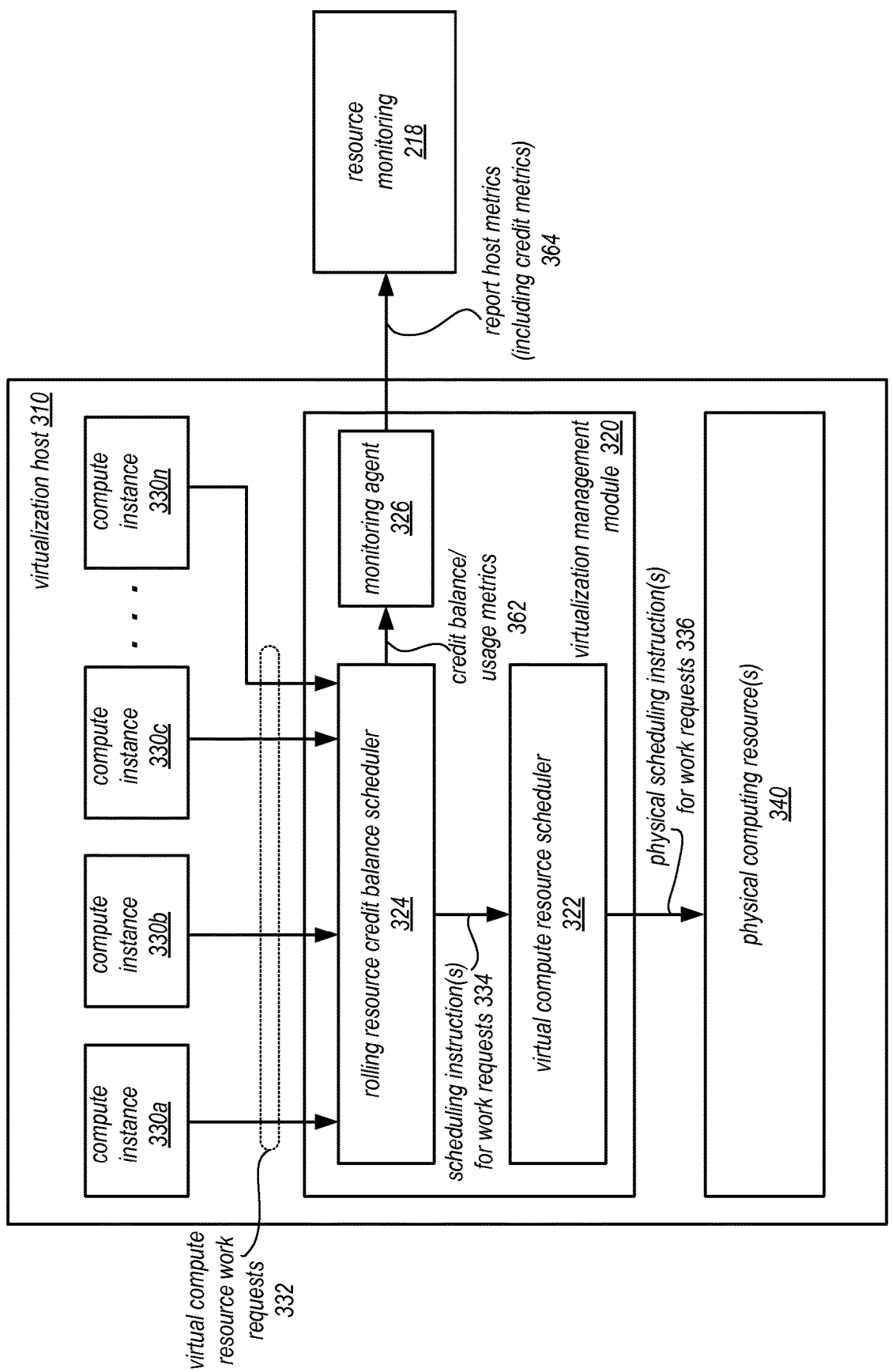
FIG. 3 is a block diagram illustrating a virtualization host that implements rolling resource credits for scheduling virtual computer resources, according to some embodiments.

Rolling resource credits for scheduling virtual computer resources may be implemented for multiple virtual compute instances hosted at the same virtualization host (as illustrated in FIGS. 2 and 3 discussed below). Implementing a rolling resource credit balance limit 120 may keep any one compute instance from amassing enough resource credits to block the performance of work requests for other instances. For example, if, as illustrated in FIG. 1, the rolling resource credit balance limit is set to 144 resource credits, then the most any one virtual compute instance may monopolize a physical computer resource is 2 hours and 24 minutes (assuming resource credits are equivalent to a 1 minute full utilization of a resource).

Please note that previous descriptions are not intended to be limiting, but are merely provided as an example of a rolling resource credit balance and usage for a compute instance. Accumulation rates, initial balances and balances limits may all be different, as may be the various amounts in which resource credits may be used.

This specification next includes a general description virtual computing resource provider, which may implement a network entity registry for network entity handles included in network traffic policies enforced for a provider network. Then various examples of a virtual computing resource provider are discussed, including different components/modules, or arrangements of components/module that may be employed as part of implementing a virtual computing resource provider. A number of different methods and techniques to implement a network entity registry for network entity handles included in network traffic policies enforced for a provider network are then discussed, some of which are illustrated in accompanying flowcharts. Finally, a description of an example computing system upon which the various components, modules, systems, devices, and/or nodes may be implemented is provided. Various examples are provided throughout the specification.

FIG. 2 is a block diagram illustrating a network-based virtual computing service that provides virtual compute instances implementing rolling resource credits for scheduling virtual computing resources, according to some embodiments. Network-based virtual computing service 200 may be set up by an entity such as a company or a public sector organization to provide one or more services (such as various types of cloud-based computing or storage) accessible via the Internet and/or other networks to clients 202. Network-based virtual computing service 200 may include numerous data centers hosting various resource pools, such as collections of physical and/or virtualized computer servers, storage devices, networking equipment and the like, needed to implement and distribute the infrastructure and services offered by the network-based virtual computing service 200. In some embodiments, network-based virtual computing service 200 may provide computing resources. These computing resources may in some embodiments be offered to clients in units called "instances," 234 such as virtual compute instances.

In various embodiments, network-based virtual computing service 200 may implement a control plane 210 in order to manage the computing resource offerings provided to clients 202 by network-based virtual computing service 200. Control plane 210 may implement various different components to manage the computing resource offerings. Control plane 210 may be implemented across a variety of servers, nodes, or other computing systems or devices (such as computing system 1000 described below with regard to FIG. 9). It is noted that where one or more instances of a given component may exist, reference to that component herein may be made in either the singular or the plural. However, usage of either form is not intended to preclude the other.

In at least some embodiments, control plane 210 may implement interface 212. Interface 212 may be configured to process incoming requests received via network 260 and direct them to the appropriate component for further processing. In at least some embodiments, interface 212 may be a network-based interface and may be implemented as a graphical interface (e.g., as part of an administration control panel or web site) and/or as a programmatic interface (e.g., handling various Application Programming Interface (API) commands). In various embodiments, interface 212 may be implemented as part of a front end module or component dispatching requests to the various other components, such as resource management 214, reservation management 216, resource monitoring 218, and billing 220. Clients 202 may, in various embodiments, may not directly provision, launch or configure resources but may send requests to control plane 210 such that the illustrated components (or other components, functions or services not illustrated) may perform the requested actions.

Control plane 210 may implement resource management module 214 to manage the access to, capacity of, mappings to, and other control or direction of computing resources offered by provider network. In at least some embodiments, resource management module 214 may provide both a direct sell and $3^{rd}$ party resell market for capacity reservations (e.g., reserved compute instances). For example, resource management module 214 may allow clients 202 via interface 212 to learn about, select, purchase access to, and/or reserve capacity for computing resources, either from an initial sale marketplace or a resale marketplace, via a web page or via an API. For example, resource management component may, via interface 212, provide a listings of different available compute instance types, each with a different credit accumulation rate. Additionally, in some embodiments, resource management module 214 may be configured to offer credits for purchase (in addition to credits provided via the credit accumulation rate for an instance type) for a specified purchase amount or scheme (e.g., lump sum, additional periodic payments, etc.). For example, resource management module 214 may be configured to receive a credit purchase request (e.g., an API request) and credit the virtual instance balance with the purchased credits. Similarly, resource management module 214 may be configured to handle a request to increase a credit accumulation rate for a particular instance. Resource management 214 may also offer and/or implement a flexible set of resource reservation, control and access interfaces for clients 202 via interface 212. For example resource management module 214 may provide credentials or permissions to clients 202 such that compute instance control operations/interactions between clients and in-use computing resources may be performed.

In various embodiments, reservation management module 216 may be configured to handle the various pricing schemes of instances 234 (at least for the initial sale marketplace) in various embodiments. For example network-based virtual computing service 200 may support several different purchasing modes (which may also be referred to herein as reservation modes) in some embodiments: for example, term reservations (i.e. reserved compute instances), on-demand resource allocation, or spot-price-based resource allocation. Using the long-term reservation mode, a client may make a low, one-time, upfront payment for a compute instance or other computing resource, reserve it for a specified duration such as a one or three year term, and pay a low hourly rate for the instance; the client would be assured of having the reserved instance available for the term of the reservation. Using on-demand mode, a client could pay for capacity by the hour (or some appropriate time unit), without any long-term commitments or upfront payments. In the spot-price mode, a client could specify the maximum price per unit time that it is willing to pay for a particular type of compute instance or other computing resource, and if the client's maximum price exceeded a dynamic spot price determined at least in part by supply and demand, that type of resource would be provided to the client.

During periods when the supply of the requested resource type exceeded the demand, the spot price may become significantly lower than the price for on-demand mode. In some implementations, if the spot price increases beyond the maximum bid specified by a client, a resource allocation may be interrupted—i.e., a resource instance that was previously allocated to the client may be reclaimed by the resource management module 330 and may be allocated to some other client that is willing to pay a higher price. Resource capacity reservations may also update control plane data store 222 to reflect changes in ownership, client use, client accounts, or other resource information.

Figure 8:
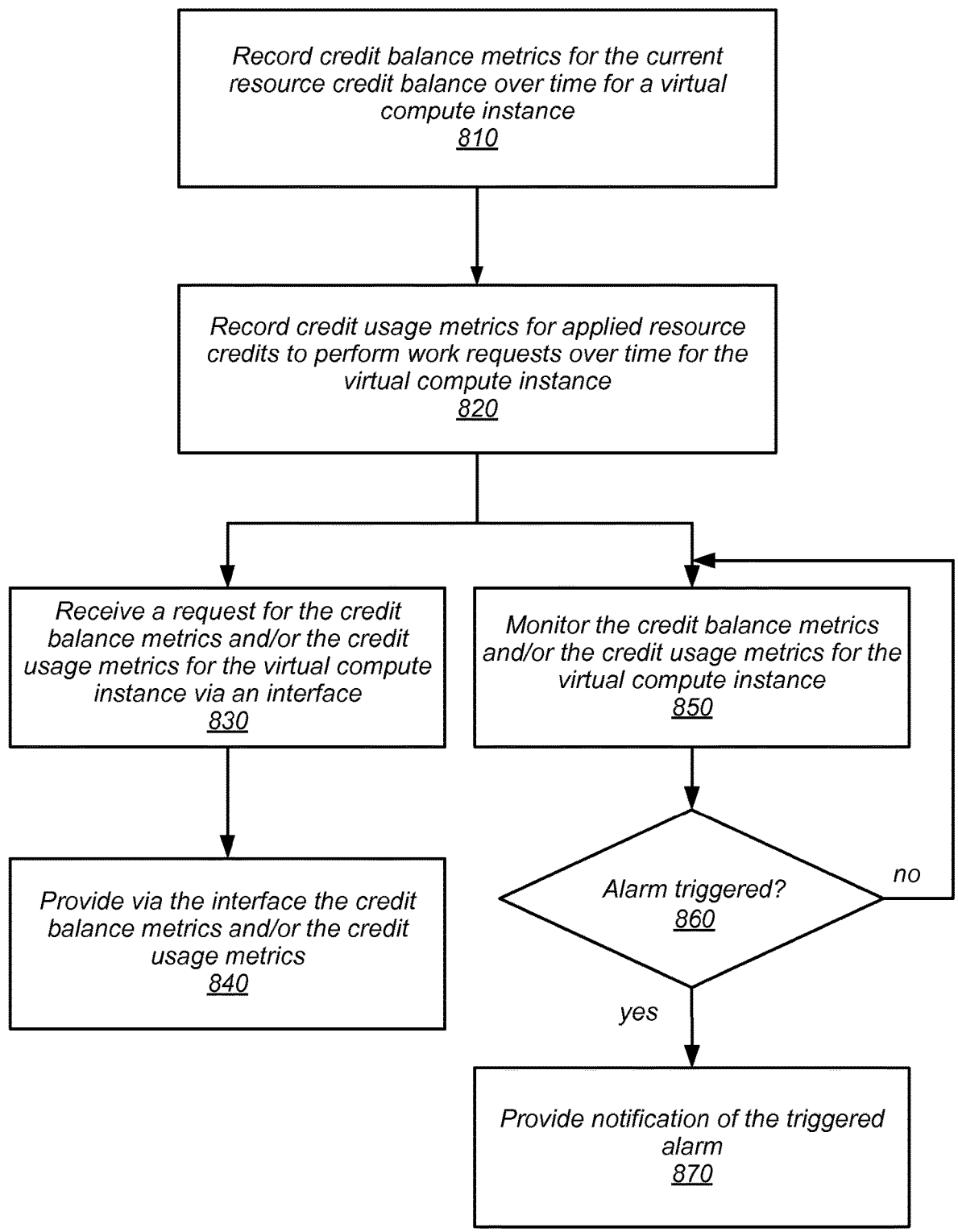
FIG. 8 is a high-level flowchart illustrating various methods and techniques for recording and utilizing data metrics for virtual compute instances implementing rolling credit resources for scheduling virtual computer resources, according to some embodiments.

In various embodiments, control plane 210 may implement resource monitoring module 218. Resource monitoring module 218 may track the consumption of various computing instances, (e.g., resource credit balances, resource credit consumption) consumed for different virtual computer resources, clients, user accounts, and/or specific instances. In at least some embodiments, resource monitoring module 218 may implement various administrative actions to stop, heal, manage, or otherwise respond to various different scenarios in the fleet of virtualization hosts 230 and instances 234. Resource monitoring module 218 may also provide access to various metric data for client(s) 202 as well as manage client configured alarms. FIG. 8, discussed in detail below provides further examples of various techniques that resource monitoring module may implement.

In various embodiments, control plane 210 may implement billing management module 220. Billing management module 220 may be configured to detect billing events (e.g., specific dates, times, usages, requests for bill, or any other cause to generate a bill for a particular user account or payment account linked to user accounts). In response to detecting the billing event, billing management module may be configured to generate a bill for a user account or payment account linked to user accounts.

A virtual compute instance 234 may, for example, comprise one or more servers with a specified computational capacity (which may be specified by indicating the type and number of CPUs, the main memory size, and so on) and a specified software stack (e.g., a particular version of an operating system, which may in turn run on top of a hypervisor). A number of different types of computing devices may be used singly or in combination to implement the compute instances 234 of network-based virtual computing service 200 in different embodiments, including general purpose or special purpose computer servers, storage devices, network devices and the like. In some embodiments instance clients 202 or other any other user may be configured (and/or authorized) to direct network traffic to a compute instance 234.

Compute instances 234 may operate or implement a variety of different platforms, such as application server instances, Java™ virtual machines (JVMs), general purpose or special-purpose operating systems, platforms that support various interpreted or compiled programming languages such as Ruby, Perl, Python, C, C++ and the like, or high-performance computing platforms) suitable for performing client 202 applications, without for example requiring the client 202 to access an instance 234. There may be various different types of compute instances. In at least some embodiments, there may be compute instances that implement rolling resource credit balances for scheduling virtual computer resource operations. This type of instance may perform based on resource credits, where resource credits represent time an instance can spend on a physical resource doing work (e.g., processing time on a physical CPU, time utilizing a network communication channel, etc.). The more resource credits an instance has for computer resources, the more time it may spend on the physical resources executing work (increasing performance). Resource credits may be provided at launch of an instance, and may be defined as utilization time (e.g., CPU time, such as CPU-minutes), which may represent the time an instance's virtual resources can spend on underlying physical resources performing a task.

In various embodiments, resource credits may represent time or utilization of resources in excess of a baseline utilization guarantee. For example, a compute instance may have a baseline utilization guarantee of 10% for a resource, and thus resource credits may increase the utilization for the resource above 10%. Even if no resource credits remain, utilization may still be granted to the compute instance at the 10% baseline. Credit consumption may only happen when the instance needs the physical resources to perform the work above the baseline performance. In some embodiments credits may be refreshed or accumulated to the resource credit balance whether or not a compute instance submits work requests that consume the baseline utilization guarantee of the resource.

Different types of compute instances implementing rolling resource credits for scheduling computer resources may be offered. Different compute instances may have a particular number of virtual CPU cores, memory, cache, storage, networking, as well as any other performance characteristic. Configurations of compute instances may also include their location, in a particular data center, availability zone, geographic, location, etc . . . and (in the case of reserved compute instances) reservation term length. Different compute instances may have different resource credit accumulation rates for different virtual resources, which may be a number of resource credits that accumulate to the current balance of resource credits maintained for a compute instance. For example, one type of compute instance may accumulate 6 credits per hour for one virtual computer resource, while another type of compute instance may accumulate 24 credits per hour for the same type of virtual computer resource, in some embodiments. In another example the resource credit accumulation rate for one resource (e.g., vCPU) may be different than the resource credit accumulation rate for a different virtual computer resource (e.g., networking channel) for the same virtual compute instance. In some embodiments, multiple different resource credit balances may be maintained for a virtual compute instance for the multiple different virtual computer resources used by the virtual compute instances. A baseline performance guarantee may also be implemented for each of the virtual computer resources, which may be different for each respective virtual computer resource, as well as for the different instance types.

Baseline performance guarantees may be included along with the resource credit accumulation rates, in some embodiments. Thus, in one example, an instance type may include a specific resource credit accumulation rate and guaranteed baseline performance for processing, and another specific resource credit accumulation rate and guaranteed baseline performance rate for networking channels. In this way, network-based virtual computing service 200 may offer many different types of instances with different combinations of resource credit accumulation rates and baseline guarantees for different virtual computer resources.

These different configurations may be priced differently, according to the resource credit accumulation rates and baseline performance rates, in addition to the various physical and/or virtual capabilities. In some embodiments, a virtual compute instance may be reserved and/or utilized for an hourly price. While, a long-term reserved instance configuration may utilize a different pricing scheme, but still include the credit accumulation rates and baseline performance guarantees.

Figure 9:
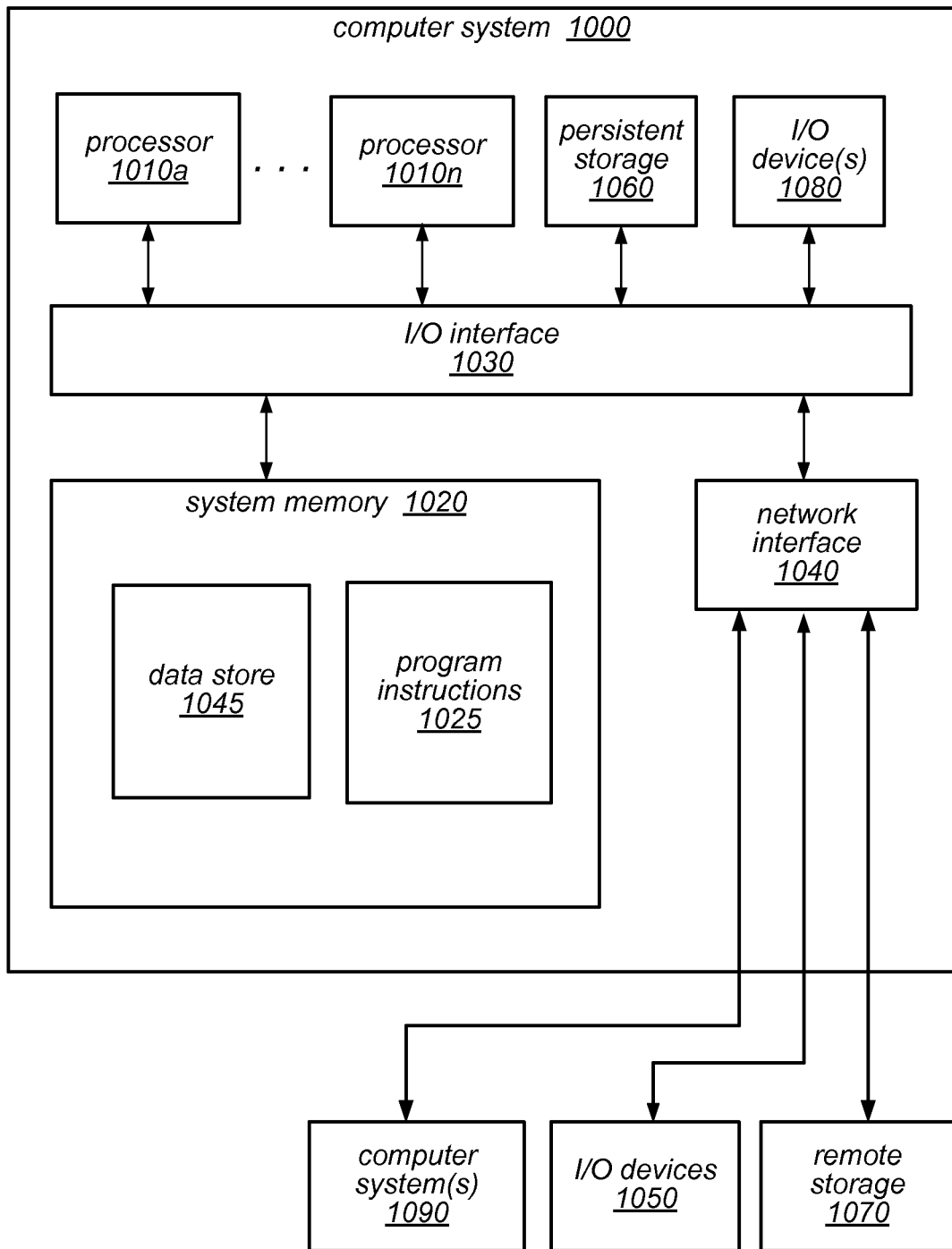
FIG. 9 is a block diagram illustrating an example computing system, according to some embodiments.

As illustrated in FIG. 2, a virtualization host 230, such as virtualization hosts 230a, 230b, through 230n, may implement and/or manage multiple compute instances 234, in some embodiments, and may be one or more computing devices, such as computing system 1000 described below with regard to FIG. 9. A virtualization host 230 may include a virtualization management module 232, such as virtualization management modules 232a, 232b through 232n, capable of instantiating and managing a number of different client-accessible virtual machines or compute instances 234. The virtualization management module 232 may include, for example, a hypervisor and an administrative instance of an operating system, which may be termed a "domain-zero" or "dom0" operating system in some implementations. The dom0 operating system may not be accessible by clients on whose behalf the compute instances 234 run, but may instead be responsible for various administrative or control-plane operations of the network provider, including handling the network traffic directed to or from the compute instances 234.

Client(s) 202 may encompass any type of client configurable to submit requests to network-based virtual computing service 200. For example, a given client 202 may include a suitable version of a web browser, or may include a plug-in module or other type of code module configured to execute as an extension to or within an execution environment provided by a web browser. Alternatively, a client 202 may encompass an application such as a dashboard application (or user interface thereof), a media application, an office application or any other application that may make use of compute instances 234 to perform various operations. In some embodiments, such an application may include sufficient protocol support (e.g., for a suitable version of Hypertext Transfer Protocol (HTTP)) for generating and processing network-based services requests without necessarily implementing full browser support for all types of network-based data. In some embodiments, clients 202 may be configured to generate network-based services requests according to a Representational State Transfer (REST)-style network-based services architecture, a document- or message-based network-based services architecture, or another suitable network-based services architecture. In some embodiments, a client 202 (e.g., a computational client) may be configured to provide access to a compute instance 234 in a manner that is transparent to applications implement on the client 202 utilizing computational resources provided by the compute instance 324.

Clients 202 may convey network-based services requests to network-based virtual computing service 200 via network 260. In various embodiments, network 260 may encompass any suitable combination of networking hardware and protocols necessary to establish network-based communications between clients 202 and network-based virtual computing service 200. For example, a network 260 may generally encompass the various telecommunications networks and service providers that collectively implement the Internet. A network 260 may also include private networks such as local area networks (LANs) or wide area networks (WANs) as well as public or private wireless networks. For example, both a given client 202 and network-based virtual computing service 200 may be respectively provisioned within enterprises having their own internal networks. In such an embodiment, a network 260 may include the hardware (e.g., modems, routers, switches, load balancers, proxy servers, etc.) and software (e.g., protocol stacks, accounting software, firewall/security software, etc.) necessary to establish a networking link between given client 202 and the Internet as well as between the Internet and network-based virtual computing service 200. It is noted that in some embodiments, clients 202 may communicate with network-based virtual computing service 200 using a private network rather than the public Internet.

FIG. 3 is a block diagram illustrating a virtualization host that implements rolling resource credits for scheduling virtual computer resources, according to some embodiments. As noted above in FIG. 2, virtualization hosts may serve as a host platform for one or more virtual compute instances. These virtual compute instances may utilize virtualized hardware interfaces to perform various tasks, functions, services and/or applications. As part of performing these tasks, virtual compute instances may utilize virtualized computer resources (e.g., virtual central processing unit(s) (vCPU(s)) which may act as the virtual proxy for the physical CPU(s)) implemented at the virtualization host in order to perform work on respective physical computer resources for the respective compute instance.

FIG. 3 illustrates virtualization host 310. Virtualization host 310 may host compute instances 330a, 330b, 330c, through 330n. In at least some embodiments, the compute instances 330 may be the same type of compute instance. In FIG. 3, compute instances 330 are compute instances that implement rolling resource credits for scheduling virtual computer resources. Virtualization host 310 may also implement virtualization management module 320, which may handle the various interfaces between the virtual compute instances 330 and physical computing resource(s) 340 (e.g., various hardware components, processors, I/O devices, networking devices, etc.).

In FIG. 3, virtualization management module 320 may implement rolling resource credit balance scheduler 324. Rolling resource credit balance scheduler 324 may act as a meta-scheduler, managing, tracking, applying, deducting, and/or otherwise handling all resource credit balances for each of compute instances 330. In various embodiments rolling resource credit balance scheduler 324 may be configured to receive virtual compute resource work requests 332 from computes instances. Each work request 332 may be directed toward the virtual computer resource corresponding to the compute instance that submitted the work. For each request 332, rolling resource credit balance scheduler may be configured to determine a current resource credit balance for the requesting compute instance 330, and generate scheduling instructions to apply resource credits when performing the work request. In some embodiments, rolling resource credit balance scheduler 324 may perform or direct the performance of the scheduling instructions, directing or sending the work request to the underlying physical computing resources 340 to be performed. For example, in some embodiments different hardware queues may be implemented and rolling resource credit balance scheduler 324 may be used to place tasks for performing work requests in the queues according to the applied resource credits (e.g., queuing tasks according to the amount of time of applied resource credits). However, in some embodiments the resource scheduling instructions may be sent 334 to virtual compute resource scheduler 322, which may be a scheduler for the physical resources 340, such as CPU(s), implemented at virtualization host 310. Rolling resource credit balance scheduler 324 may be configured to perform the various techniques described below with regard to FIGS. 5-7, in order to apply resource credits, deduct resource credits, and/or otherwise ensure that work requests are performed according to the applied resource credits.

In some embodiments, in response to receiving the scheduling instructions, virtual compute resource scheduler 322 may provide physical scheduling instructions for work requests 336 to physical computing resources, such as physical CPU(s), in various embodiments. In at least some embodiments, virtual compute resource scheduler 322 may be a credit-based scheduler for one or more CPUs.

Rolling resource credit balance scheduler 324 may also report credit balance and usage metrics 362 to monitoring agent 326, which may in turn report these metrics along with any other host metrics 364 (health information, etc.) to resource monitoring module 218.

Figure 4:
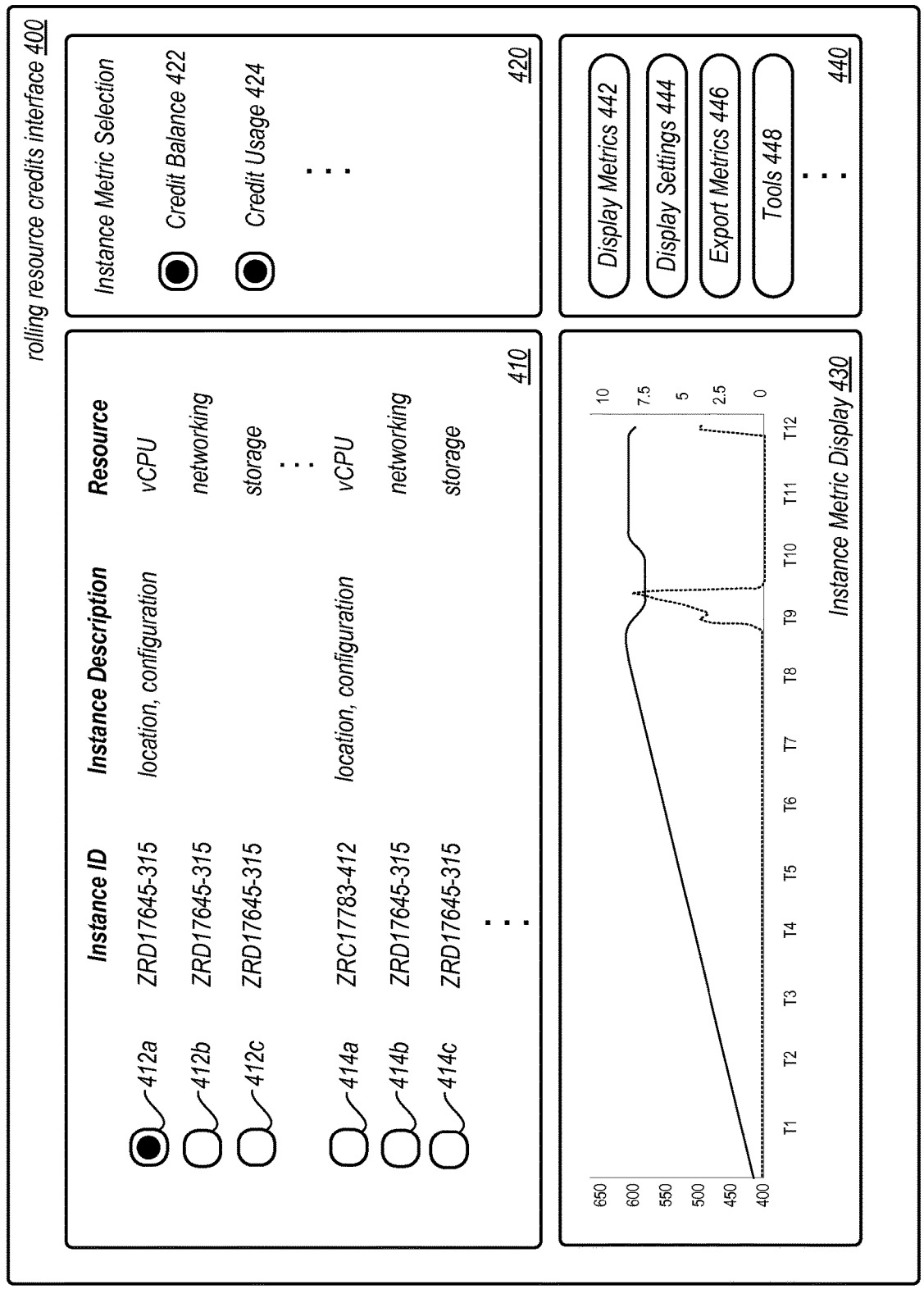
FIG. 4 is an example illustration of an interface providing rolling credit metrics for a virtual compute instance, according to some embodiments.

As noted above, with regard to FIG. 2, a network-based interface for a virtual computing resource provider may be implemented graphically. FIG. 4 is an example illustration of an interface providing rolling credit metrics for a virtual compute instance, according to some embodiments. Rolling resource credits interface 400 may be implemented as network-based site accessible various clients. In some embodiments, rolling resource credits interface 400 may be implemented as a downloadable or locally run application which may communicate with a network-based virtual computing resource provider via a programmatic interface, such as an API.

Area 410 illustrates a listing of various instances for which metrics data may be displayed. Various different user interface elements, such as selectors 412a, 412b, 412c, 414a, 414b and 414c may be implemented to indicate which physical resource and particular instance data should be retrieved for. Area 420 illustrates the different types of metrics data that may be selected for display. For example, in some embodiments resource credit balance metrics 422 for a particular instance may be selected, as well as resource credit usage 424 by the selected instance. In some embodiments, the credit refresh rate for a particular instance may be illustrated. Area 430 may represent an instance metric display area. The retrieved instance metrics may be displayed in various forms (such as the illustrated line graph, charts, tables, or any other graphical or textual data representation technique). Area 440 may represent different user interface elements to change the format of the displayed metric data. For example, display settings 444 may be selected, opening a pop-window or dialog box which allows for different display settings, such as the range of time for which data is displayed, to be modified. Display metrics element 442 may be selected to enact the changes made, generating or regenerating the displayed data in instance metric display 430. The export metrics 446 element may be configured to provide various mechanisms for extracting raw metrics data to be downloaded or stored in a location specified by a user (e.g., opening a file dialog window). Tools element 448 may be selectable to run various different tools, analysis, or other recommendation engines based on the metric data. For example, a tool may be selected that recommends whether or not to change instance type (e.g., to a bigger or smaller burst processing instance).

Please note, that the illustration and accompanying description for FIG. 4 is merely intended to provide an example of a graphical user interface. Various other configurations and interfaces, not including graphical interfaces may be implemented, and thus the previous example is not intended to be limiting. For example, the various requests for data, metrics, or other information discussed above may be requested from the virtual computing resource provider via a programmatic interface (API) and the raw data provided back to a requesting client. If, for instance a client requested via an API for the virtual computing resource provider, credit usage and refresh rates for a particular compute instance, the metrics or tracked information for the client may be provided to the client.

Figure 5:
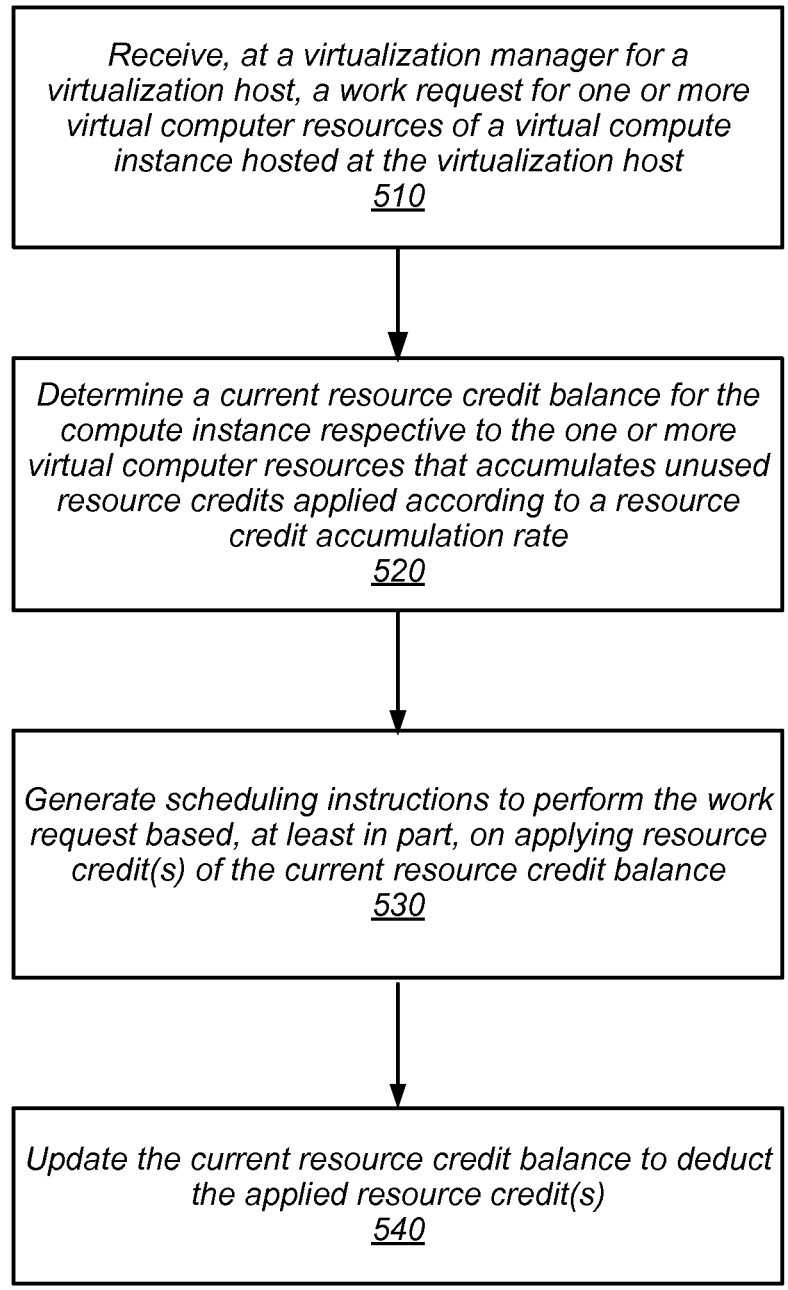
FIG. 5 is high-level flowchart illustrating various methods and techniques for implementing rolling computer resource credits for scheduling virtual computer resources, according to some embodiments.

The examples of implementing rolling resource credits for scheduling virtual computing resources discussed above with regard to FIGS. 2-4 have been given in regard to virtual computing resources offered by a network-based computing resource service. Various other types or configurations of virtual computing resources may implement these techniques, which may or may not be offered as part of a network-based service. Other virtual computing resources, for example, which want to be available for burst processing or other burst utilization at high performance levels for shorter periods of time, for instance, may implement rolling resource credits for scheduling virtual computing resources. FIG. 5 is high-level flowchart illustrating various methods and techniques for implementing rolling resource credits for scheduling virtual computer resources, according to some embodiments. These techniques may be implemented using various components of network-based virtual computing service as described above with regard to FIGS. 2-4 or other virtual computing resource hosts.

As indicated at 510, a work request for one or more virtual computer resources may be received at virtualization host for a virtual compute instance. The request may identify the virtual computer resource (e.g., processing, networking, storage, etc.). The work request may identify the workload or amount of tasks to be performed in order to complete the work request.

As indicated at 520, a current resource credit balance for the compute instance respective the virtual computer resources may be determined. A resource credit accumulation rate may be a number of resource credits added to a current resource credit balance that are unused in a time period, in various embodiments. For example, if the resource credit accumulation rate is set at 12 resource credits per hour, then every resource credit not consumed during the hour may be added to the current resource credit balance total (e.g., if 9/12 are not used, then 9 may be added). In some embodiments, the resource credit accumulation rate may correspond to a baseline utilization or performance guarantee for the virtual compute instance. The higher the current resource credit balance, the longer the virtual compute instance may be able to sustain a higher level of performance using the virtual computer resource. As multiple different resource credit balances may be implemented for different virtual computer resources, the determined credit resource balance may be specific to the virtual computer resources performing the work request.

In at least some embodiments, resource credit accumulations may be limited to a particular time period. Thus, unused resource credits that were accumulated prior to the resource credit accumulation time period may not be included in a current resource credit balance. For example, in some embodiments the resource credit accumulation time may be 24 hours, excluding any unused resource credits accumulated earlier than 24 hours prior to a given point in time. In various embodiments, at least one of the resource credits available in the current resource credit balance is carried over from a time period prior to a current time period.

Figure 7:
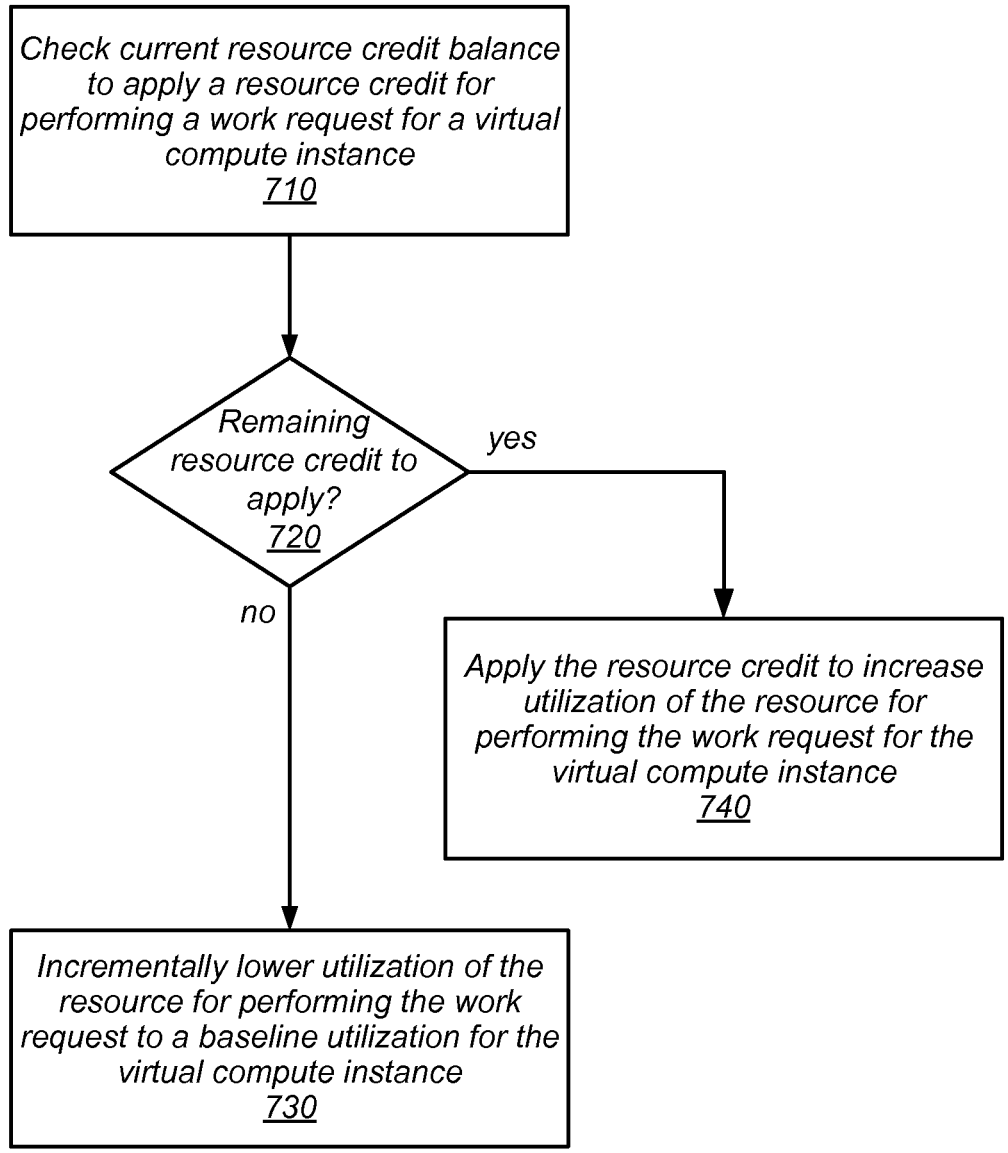
FIG. 7 is high-level flowchart illustrating various methods and techniques for lowering or raising utilization of a physical computer resource according to available resource credits for a work request for a virtual compute instance, according to some embodiments.

As indicated at 530, scheduling instructions may be generated to perform the work request based, at least in part, on applying one or more resource credits. Thus, the scheduling instructions may, in some embodiments, specify a duration at which underlying physical computer resource(s) that performs the work request for/as the virtual computer resource(s) are utilized. In some embodiments, the generated scheduling instructions may be implemented as task or hardware queues for the physical computer resource(s). In some embodiments, another scheduler or virtual computer resource driver or manager may receive the instructions as input, parameters, and/or other information upon which to direct the performance of the work request at the physical resource(s). FIG. 7, discussed below, describes various techniques for applying available resource credits, as well as handling the scenario when resource credits are unavailable to perform the work request. As indicated at 540, the current resource credit balance may be updated to deduct the applied resource credit(s).

Please note, that the various elements described in FIG. 5 may be repeated multiple times, in some embodiments, for performing work requests for different virtual computer resources relying upon different physical resources. Additionally, different orderings of the elements may be performed. Thus, the illustration and previous discussion is not intended to be limiting.

Figure 6:
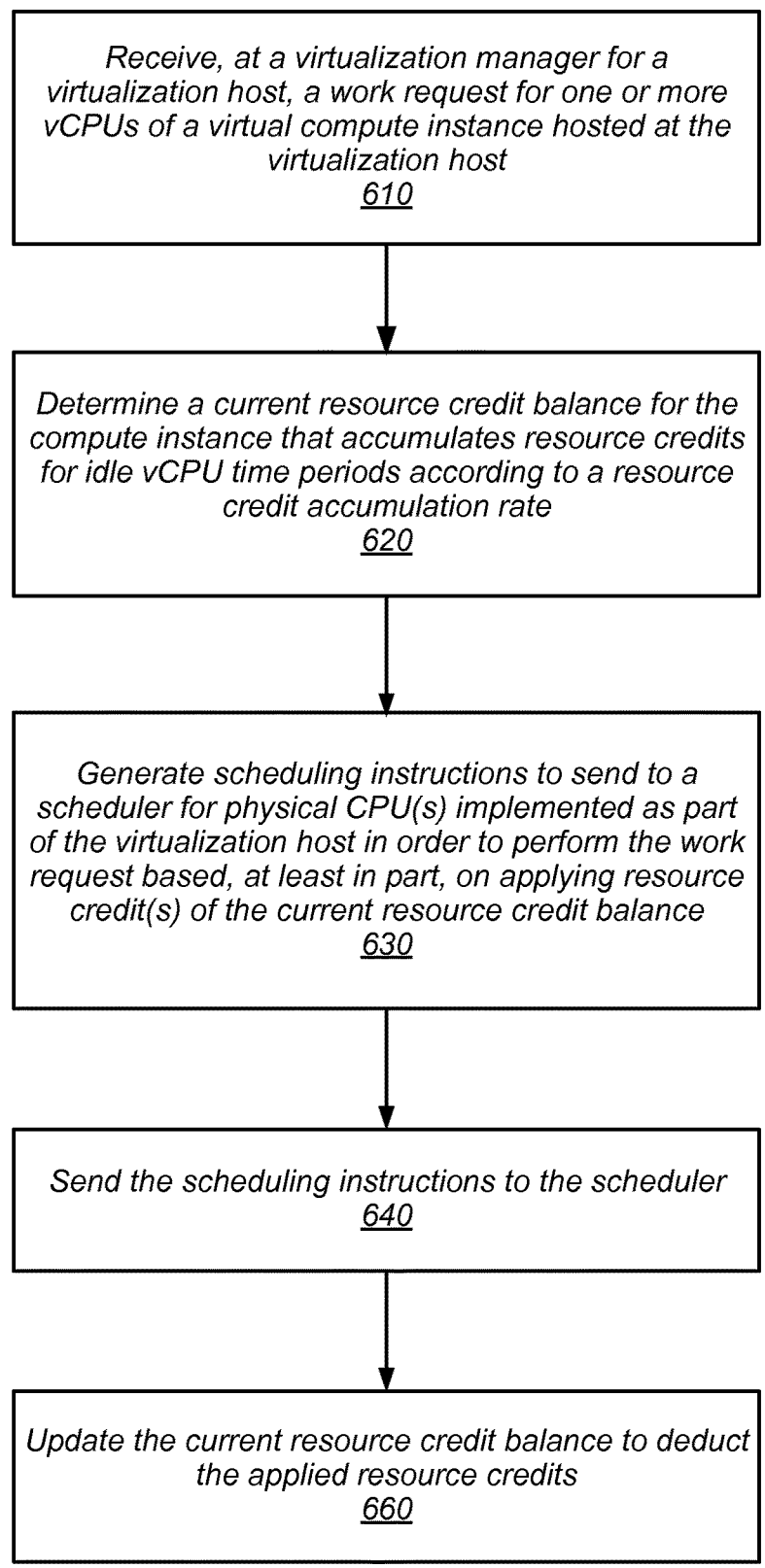
FIG. 6 is a high-level flowchart illustrating various methods and techniques for implementing rolling computer resource credits for scheduling processing resources for a virtual computer, according to some embodiments.

FIG. 6 illustrates an example of performing the various techniques described above with regard to FIG. 5 for processing resources. As indicated at 610, a work request for one or more virtual central processing units (vCPUs) of a virtual compute instance may be received at a virtualization manager for a virtualization host that hosts the virtual compute instance. A work request may be for a particular process, task, or other action to be performed by the one or more vCPUs of the virtual compute instance. For example, the particular process may be to execute one or more instructions implementing a particular program or application performed or executed by the virtual compute instance. The work request may indicate the load or amount of processing to be used, in some embodiments.

As indicated at 620, a current resource credit balance for the compute instance that accumulates resource credits for idle vCPU time periods according to a resource credit accumulation rate may be determined. As noted above, a resource credit accumulation rate may be a number of resource credits added to a current resource credit balance for a virtual instance that is idle for a time period, in various embodiments. For example, if the resource credit accumulation rate is set at 12 resource credits per hour, then every resource credit not consumed during the hour may be added to the current resource credit balance total (e.g., if 9/12 are not used, then 9 may be added). In some embodiments, the resource credit accumulation rate may correspond to a baseline utilization or performance guarantee for the virtual compute instance. For example, if the baseline utilization or performance guarantee for the virtual compute instance is 10% for an hour period, then a virtual compute instance may be said to have 6 minutes of exclusive processing time on the physical CPU(s). If none or only some of those 6 minutes are used, then the remaining minutes may be effectively carried over to the next time period (e.g., next hour). The higher the current resource credit balance, the longer the virtual compute instance may be able to sustain a higher level of performance, as resource credits may be consumed when the physical CPU perform the requested work.

As indicated at 630, scheduling instructions may be generated to perform the work request based, at least in part on the determined current resource credit balance, in some embodiments. The scheduling instructions may be generated in a format to be sent to a scheduler that schedules tasks or work for one or more physical central processing units (CPUs). These CPU(s) may perform the actual processing of the work requests that the virtualization host directs to its own vCPU(s), as discussed above. The instructions themselves may be configured to apply resource credits (if available) to increase the utilization of the physical CPU(s) for a current time period. Resource credits may represent an amount of work or time for which the physical CPU may be exclusively utilized by the virtual compute host. Thus, the instructions may be configured to ensure that the scheduler schedules time of full utilization equivalent to the applied resource credits. For example, the scheduler for the physical CPU(s) may be configured to receive different parameters instructing how work requests for a particular virtual compute instance are to be handled. These parameters may include, but are not limited to sizing time slices, priorities, proportional shares, accounting periods, and/or capacities. In at least some embodiments, the scheduler may be a credit-based scheduler that provides a proportional, fair-share scheduler. As discussed below with regard to FIG. 7, if resource credits in the current resource credit balance run out prior to the completion of a work request (or are not there at the beginning of performing the work request), then the generated instructions may be configured to perform the work request according to a baseline performance requirement (e.g., 10%, 20% or 40% CPU utilization) or to incrementally lower the performance of the work request to equal the baseline performance requirement after a certain period of time has elapsed.

As indicated at 640, the scheduling instructions may then be sent to the scheduler for the physical CPU(s), in various embodiments. Sending the scheduling instructions may include programmatically calling, invoking, or launching the scheduler to perform the work request, passing along various parameters and/or other information to schedule the performance of the work request according to the generated scheduling instructions. As indicated at 550, the current resource credit balance may be updated to deduct resource credits that are applied when performing the work request.

Please note, that the various elements described in FIG. 6 may be repeated multiple times, in some embodiments, for performing various sub parts of a work request. Additionally, different orderings of the elements may be performed, such as updating the resource credit balance prior to sending the scheduling instructions to the scheduler. Thus, the illustration and previous discussion is not intended to be limiting.

As noted above, resource credits may raise the amount of time for which a particular virtual compute instance may utilize a physical resource, such as one or more CPUs. Conversely, a lack of resource credits may lower the utilization of a physical resource. FIG. 6 is high-level flowchart illustrating various methods and techniques for lowering or raising utilization of a physical computer resource according to available resource credits for a work request for a virtual compute instance, according to some embodiments.

As indicated at 610, a current resource credit balance for a virtual compute instance may be checked to apply a resource credit for performing a work request, in various embodiments. If there is a resource credit to apply, as indicated by the positive exit from 620, then the resource credit may be applied to increase the utilization of the physical resource(s) for performing the work request for the virtual compute instance, as indicated at 640. A resource credit, as stated previously may provide additional time to utilize a physical resource for performing a work request. If, for instance the baseline processing rate for a virtual compute instances is 6 minutes every hour (e.g., 10% utilization), then adding an additional computing resource credit of equaling 1 additional minute may raise the processing utilization rate to 7 minutes every hour (e.g., 11.667% utilization) for a work request directed toward vCPU(s).

If, however, no resource credit remains to apply, as indicated by the negative exit from 620, then the utilization of physical resources for performing the work request may be incrementally lowered to a baseline utilization rate for the virtual resource at the virtual compute instance. For example, the current utilization of a vCPU for a virtual compute instance (e.g., 25%) may be lowered in increments spread out over a particular time period (e.g., 15 minutes) to gradually lower the utilization rate. Therefore, if the baseline utilization rate for the vCPU at the virtual compute instance is 10%, then the 15% utilization may be divided up into individual changes to the rate spread evenly (or nearly evenly) across the 15 minute time period. Lowering the utilization incrementally may prevent virtual compute instances (and any clients or systems interaction with them) that are out of resource credits from facing fast performance drop off.

Unlike virtual compute instances that provide dedicated resources for a particular client, the behavior or use of virtual instances that implement rolling resource credits for scheduling virtual computer resources may need to be analyzed in order to determine if the allocated resource utilization is sufficiently meeting a particular client's needs that purchased or reserved the virtual compute instance. Clients or customers may want to determine if they have made the proper selection of a particular type of compute instance providing rolling resource credits. For example, a customer that reserved a virtual compute resource that provides a medium size resource credit accumulation rate may be able to discern based on the credits used and/or the history of the credit balance whether a smaller or larger virtual compute instances may be appropriate. FIG. 8 is a high-level flowchart illustrating various methods and techniques for recording and utilizing data metrics for virtual compute instances implementing rolling credit resources for scheduling virtual computer resources, according to some embodiments.

As indicated at 810, credit balance metrics may be recorded for the current resource credit balance over time for a virtual compute instance. The current resource credit balance may be recorded at varying levels of granularity. For example, in some embodiments, the current resource credit balance may only be recorded when a change occurs (e.g., wherein the balance is increased or decreased). In another example, a very small period of time elapse between recording the current resource credit balance, even though no change may have occurred. In some embodiments, clients, administrators, or other users may be able to tune the granularity of the time intervals when the data is recorded. The credit balance metrics may be stored in a persistent data storage system, such as a database. The data metrics may be stored in a database so as to be selectively retrievable. For example, storing the metrics in a database may allow for specific queries to obtain particular ranges of information, min values, max values, or other more specialized or select data sets, without returning the entire data set of metrics.

As indicated at 820, credit usage metrics for applied resource credits to perform work requests over time for the virtual compute instance may be recorded. As with credit balance metrics, credit usage metrics may be stored or recorded at different times or in response to different events. For example, in some embodiments, usage values may be recorded every time a particular credit is applied to perform a work request. Alternatively, aggregate usage amounts, such as the amount of credits applied to an entire work request (e.g., 30) may be represented as a single data point. Of course various other combinations or granularities in between these two examples may be implemented (e.g., recording the applied credits that are used in performing a portion of a particular work request, such as 4 applied credits out of a 9 credit total cost for the work request). As with the credit balance metrics discussed above, credit usage metrics may be stored in such as to be selectively maintained. For example, storing the metrics in a database may allow for specific queries to obtain particular ranges of information, min values, max values, or other more specialized or select data sets, without returning the entire data stet of metrics.

Recorded metrics for a virtual compute instance may be used in many ways. Live reporting or streaming of metrics may be performed as new metrics are recorded for example in a dashboard or other user interface that provides current virtual resource information at a glance. Particularly, in some embodiments, the metrics for credit balances and credit usage may be provided to clients in response to a request. For example, as indicated at 830 a request may be received for the credit balance metrics and/or the credit usage metrics for the virtual compute instance via an interface. Like interface 212, the interface may be a network-based interface (e.g., accessible via a network such as the Internet) and may provide various graphical or programmatic ways of communicating. For example, in some embodiments, the network-based interface may be an Application Programming Interface (API). A particular request for the data may be formatted according to the API including various different parameters or limitations on the particular data set to be returned. Similarly, a graphical interface, such as may be hosted or implemented for a website or other displayable application may allow users to select particular information to be provided (such as discussed above with regard to FIG. 4). In response to receiving the request, the requested metrics (some, none or all of the usage metrics may be provided back via the network-based interface (e.g., via a response formatted according to an API or graphics or textual data displayed for a requestor to view), as indicated at 840.

In some embodiments, various different dynamic tools, monitors, components, or other devices may be used to analyze metric data. In some embodiments, clients of the virtual computing resource provider network may define, modify, or set alarms and notifications which may be triggered. As indicated at 850, the credit balance metrics and the user value metrics for the virtual compute instance, in various embodiments, may be monitored. For example, the current values (e.g., current resource credit balance or credit usage value) may be evaluated for particular or acute changes. For example, if resource credit usage increases quickly or crosses some kind of threshold, then an alarm may be triggered, as indicated at 860. Long term trends and other types of information may be gleaned from monitoring the credit balance and/or credit usage metrics for the virtual compute instance. For example, if long term trends show low credit use (or carrying a high current resource credit balance for a particular percentage of the time, such as 98%) then an alarm maybe triggered, as indicated 860. More generally, alarms may be configured to evaluate the credit balance metrics and/or the credit usage metrics in many ways. If no alarm is triggered, as indicated by the negative exit from 860, then monitoring of the credit balance metrics and/or usage metrics may continue.

When an alarm is triggered, as indicated by the positive exit from 860, notification of the triggered alarm may be provided, as indicated at 870, in various embodiments. For example, messaging systems (e.g., voice, text or electronic mail) may be used to notify an alarm owner/creator or the responsible party (which may be a client/customer of the virtual computing resource provider network) for the instance which triggered the alarm. In addition to providing notification of the alarm, in some embodiments, automated or programmatic action may be taken to solve or react to the alarm. If, for instance, a particular virtual instance is seeing high resource credit utilization, then the some of the work performed by the virtual instance may be shifted to another virtual instance on another virtualization host so as to scale up the number of virtual compute instances performing certain processes.

In addition to providing recorded resource credit balance metrics and/or resource credit usage metrics to clients or others on an individual virtual computer instance basis, a network-based virtual computing service provider or other implementer, operator, administrator, or other control system or agent may find an aggregate view of the credit balance metrics and/or the resource credit usage metrics insightful in to the behavior and performance of the network-based virtual computing resource provider as a whole.

For example, in some embodiments, system administrators, controls systems, or other components may implement heat or contention management to detect particular virtual compute instances that are either receiving too much traffic and, thus may be not be satisfying service guarantees to clients, or there may be too much competing activity between virtual compute instances on particular host (e.g., contention). The recorded data for each virtual compute instance on a virtualization host may be aggregated together, as discussed above with regard to resource monitoring module 218 in FIG. 2. Then based, on the aggregated metrics, administrative decisions with respect to the virtualization host may be made. For instance, if the usage metrics for different virtual compute instances on a virtualization host appear to request work on vCPUs at a similar time, then the usage metrics may indicate some level of contention among the virtual instances on the virtualization host. If, the contention level exceeds some max contention threshold, then one or more of the virtual compute instances may be moved or restarted on a different virtualization host, free up computing resources to perform the work requests of remaining virtual compute instances with greater flexibility.

Instead of relying upon (or solely upon) reporting of virtual compute instance behavior, in some embodiments a control plane, system administrator, health component, or other system or device may launch benchmark instances to run alongside other virtual compute instances on virtualization hosts. These benchmark instances may be configured to perform certain kinds of actions, such as requesting certain sizes or types of workloads for vCPUs in order to test the affect such requests may have on the performance of work requests for other virtual compute instances. Benchmark instances may also be configured to collect and report the results of their tests directly to a reporting module or service, such as resource monitoring module 218. Please note that the previous examples are not intended to be limiting, but are some of the many different ways in which collected metrics for rolling credit resources may be used.

The methods described herein may in various embodiments be implemented by any combination of hardware and software. For example, in one embodiment, the methods may be implemented by a computer system (e.g., a computer system as in FIG. 9) that includes one or more processors executing program instructions stored on a computer-readable storage medium coupled to the processors. The program instructions may be configured to implement the functionality described herein (e.g., the functionality of various servers and other components that implement the network-based virtual computing resource provider described herein). The various methods as illustrated in the figures and described herein represent example embodiments of methods. The order of any method may be changed, and various elements may be added, reordered, combined, omitted, modified, etc.

Embodiments of rolling credit resources for scheduling virtual computer resources as described herein may be executed on one or more computer systems, which may interact with various other devices. FIG. 9 is a block diagram illustrating an example computer system, according to various embodiments. For example, computer system 1000 may be configured to implement nodes of a compute cluster, a distributed key value data store, and/or a client, in different embodiments. Computer system 1000 may be any of various types of devices, including, but not limited to, a personal computer system, desktop computer, laptop or notebook computer, mainframe computer system, handheld computer, workstation, network computer, a consumer device, application server, storage device, telephone, mobile telephone, or in general any type of computing device.

Computer system 1000 includes one or more processors 1010 (any of which may include multiple cores, which may be single or multi-threaded) coupled to a system memory 1020 via an input/output (I/O) interface 1030. Computer system 1000 further includes a network interface 1040 coupled to I/O interface 1030. In various embodiments, computer system 1000 may be a uniprocessor system including one processor 1010, or a multiprocessor system including several processors 1010 (e.g., two, four, eight, or another suitable number). Processors 1010 may be any suitable processors capable of executing instructions. For example, in various embodiments, processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA. The computer system 1000 also includes one or more network communication devices (e.g., network interface 1040) for communicating with other systems and/or components over a communications network (e.g. Internet, LAN, etc.). For example, a client application executing on system 1000 may use network interface 1040 to communicate with a server application executing on a single server or on a cluster of servers that implement one or more of the components of the data warehouse system described herein. In another example, an instance of a server application executing on computer system 1000 may use network interface 1040 to communicate with other instances of the server application (or another server application) that may be implemented on other computer systems (e.g., computer systems 1090).

In the illustrated embodiment, computer system 1000 also includes one or more persistent storage devices 1060 and/or one or more I/O devices 1080. In various embodiments, persistent storage devices 1060 may correspond to disk drives, tape drives, solid state memory, other mass storage devices, or any other persistent storage device. Computer system 1000 (or a distributed application or operating system operating thereon) may store instructions and/or data in persistent storage devices 1060, as desired, and may retrieve the stored instruction and/or data as needed. For example, in some embodiments, computer system 1000 may host a storage system server node, and persistent storage 1060 may include the SSDs attached to that server node.

Computer system 1000 includes one or more system memories 1020 that are configured to store instructions and data accessible by processor(s) 1010. In various embodiments, system memories 1020 may be implemented using any suitable memory technology, (e.g., one or more of cache, static random access memory (SRAM), DRAM, RDRAM, EDO RAM, DDR 10 RAM, synchronous dynamic RAM (SDRAM), Rambus RAM, EEPROM, non-volatile/Flash-type memory, or any other type of memory). System memory 1020 may contain program instructions 1025 that are executable by processor(s) 1010 to implement the methods and techniques described herein. In various embodiments, program instructions 1025 may be encoded in platform native binary, any interpreted language such as Java™ byte-code, or in any other language such as C/C++, Java™, etc., or in any combination thereof. For example, in the illustrated embodiment, program instructions 1025 include program instructions executable to implement the functionality of a virtual computing resource provider network, in different embodiments. In some embodiments, program instructions 1025 may implement multiple separate clients, server nodes, and/or other components.

In some embodiments, program instructions 1025 may include instructions executable to implement an operating system (not shown), which may be any of various operating systems, such as UNIX, LINUX, Solaris™, MacOS™, Windows™, etc. Any or all of program instructions 1025 may be provided as a computer program product, or software, that may include a non-transitory computer-readable storage medium having stored thereon instructions, which may be used to program a computer system (or other electronic devices) to perform a process according to various embodiments. A non-transitory computer-readable storage medium may include any mechanism for storing information in a form (e.g., software, processing application) readable by a machine (e.g., a computer). Generally speaking, a non-transitory computer-accessible medium may include computer-readable storage media or memory media such as magnetic or optical media, e.g., disk or DVD/CD-ROM coupled to computer system 1000 via I/O interface 1030. A non-transitory computer-readable storage medium may also include any volatile or non-volatile media such as RAM (e.g. SDRAM, DDR SDRAM, RDRAM, SRAM, etc.), ROM, etc., that may be included in some embodiments of computer system 1000 as system memory 1020 or another type of memory. In other embodiments, program instructions may be communicated using optical, acoustical or other form of propagated signal (e.g., carrier waves, infrared signals, digital signals, etc.) conveyed via a communication medium such as a network and/or a wireless link, such as may be implemented via network interface 1040.

In some embodiments, system memory 1020 may include data store 1045, which may be configured as described herein. In general, system memory 1020 (e.g., data store 1045 within system memory 1020), persistent storage 1060, and/or remote storage 1070 may store data blocks, replicas of data blocks, metadata associated with data blocks and/or their state, configuration information, and/or any other information usable in implementing the methods and techniques described herein.

In one embodiment, I/O interface 1030 may be configured to coordinate I/O traffic between processor 1010, system memory 1020 and any peripheral devices in the system, including through network interface 1040 or other peripheral interfaces. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. Also, in some embodiments, some or all of the functionality of I/O interface 1030, such as an interface to system memory 1020, may be incorporated directly into processor 1010.

Network interface 1040 may be configured to allow data to be exchanged between computer system 1000 and other devices attached to a network, such as other computer systems 1090 (which may implement one or more storage system server nodes, database engine head nodes, and/or clients of the database systems described herein), for example. In addition, network interface 1040 may be configured to allow communication between computer system 1000 and various I/O devices 1050 and/or remote storage 1070. Input/output devices 1050 may, in some embodiments, include one or more display terminals, keyboards, keypads, touchpads, scanning devices, voice or optical recognition devices, or any other devices suitable for entering or retrieving data by one or more computer systems 1000. Multiple input/output devices 1050 may be present in computer system 1000 or may be distributed on various nodes of a distributed system that includes computer system 1000. In some embodiments, similar input/output devices may be separate from computer system 1000 and may interact with one or more nodes of a distributed system that includes computer system 1000 through a wired or wireless connection, such as over network interface 1040. Network interface 1040 may commonly support one or more wireless networking protocols (e.g., Wi-Fi/IEEE 802.11, or another wireless networking standard). However, in various embodiments, network interface 1040 may support communication via any suitable wired or wireless general data networks, such as other types of Ethernet networks, for example. Additionally, network interface 1040 may support communication via telecommunications/telephony networks such as analog voice networks or digital fiber communications networks, via storage area networks such as Fibre Channel SANs, or via any other suitable type of network and/or protocol. In various embodiments, computer system 1000 may include more, fewer, or different components than those illustrated in FIG. 9 (e.g., displays, video cards, audio cards, peripheral devices, other network interfaces such as an ATM interface, an Ethernet interface, a Frame Relay interface, etc.)

It is noted that any of the distributed system embodiments described herein, or any of their components, may be implemented as one or more network-based services. For example, a compute cluster within a computing service may present computing services and/or other types of services that employ the distributed computing systems described herein to clients as network-based services. In some embodiments, a network-based service may be implemented by a software and/or hardware system designed to support interoperable machine-to-machine interaction over a network. A network-based service may have an interface described in a machine-processable format, such as the Web Services Description Language (WSDL). Other systems may interact with the network-based service in a manner prescribed by the description of the network-based service's interface. For example, the network-based service may define various operations that other systems may invoke, and may define a particular application programming interface (API) to which other systems may be expected to conform when requesting the various operations. though In various embodiments, a network-based service may be requested or invoked through the use of a message that includes parameters and/or data associated with the network-based services request. Such a message may be formatted according to a particular markup language such as Extensible Markup Language (XML), and/or may be encapsulated using a protocol such as Simple Object Access Protocol (SOAP). To perform a network-based services request, a network-based services client may assemble a message including the request and convey the message to an addressable endpoint (e.g., a Uniform Resource Locator (URL)) corresponding to the network-based service, using an Internet-based application layer transfer protocol such as Hypertext Transfer Protocol (HTTP).

In some embodiments, network-based services may be implemented using Representational State Transfer ("RESTful") techniques rather than message-based techniques. For example, a network-based service implemented according to a RESTful technique may be invoked through parameters included within an HTTP method such as PUT, GET, or DELETE, rather than encapsulated within a SOAP message.

Although the embodiments above have been described in considerable detail, numerous variations and modifications may be made as would become apparent to those skilled in the art once the above disclosure is fully appreciated. It is intended that the following claims be interpreted to embrace all such modifications and changes and, accordingly, the above description to be regarded in an illustrative rather than a restrictive sense.

What is claimed is:

1. A system, comprising:
   a compute node, comprising at least one respective processor and a memory, that implements a virtualization host;
   the virtualization host comprising executable instructions, configured to:
      receive a work request for one or more virtual central processing units (vCPUs) submitted by a virtual compute instance as part of performing an application for a client that reserved the virtual compute instance;
      automatically add a same number of resource credits, at a resource credit accumulation rate set for the vCPUs, to a current resource credit balance for respective consecutive time periods to calculate the current resource credit balance for the virtual compute instance respective to the vCPUs, wherein:
         the current resource credit balance comprises a set of current resource credits that, when used, increase processing time allocated for a time period in excess of a baseline amount of processing time provided by a baseline utilization guarantee; and at least one current resource credit of the current resource credit balance was automatically added to the current resource credit balance from a particular time period prior to the current time period, wherein during the particular time period, the virtualization host had performed one or more prior work requests, submitted by the virtual compute instance as part of performing the application for the client, that utilized a prior amount of processing time not in excess of the baseline amount of processing time provided by the baseline utilization guarantee;

determine that a current amount of processing time to perform the work request, for the current time period, submitted by the virtual compute instance as part of performing the application for the client, is in excess of the baseline amount of processing time provided by the baseline utilization guarantee for the current time period, and responsive to the determination:

use the at least one current resource credit, automatically added for the particular time period prior to the current time period, from the current resource credit balance to increase allocation of processing time of the respective at least one processor for the current time period in excess of the baseline amount of processing time provided by the baseline utilization guarantee for the virtual compute instance;

generate one or more scheduling instructions that schedule the work request for performance utilizing the respective at least one processor of the compute node according to the use of the at least one resource credit;

perform the work request utilizing the respective at least one processor of the compute node according to the one or more scheduling instructions; and update the current resource credit balance to deduct the at least one resource credit applied to perform the work request.

2. The system of claim 1, wherein to generate the one or more scheduling instructions, the virtualization host is further configured to:

subsequent to the application of the one or more resource credits to the work request:

in response to a determination that there is no remaining resource credit in the current resource credit balance to apply to the work request, configure at least some of the one or more scheduling instructions such that utilization of the respective at least one processor is incrementally lowered to the baseline utilization for the virtual compute instance.

3. The system of claim 1, wherein the virtualization host comprises a monitoring agent, configured to track the current resource credit balance for the virtual compute instance over time and applied resource credits for work requests for the virtual compute instance over time;

wherein the compute node is implemented as part of a plurality of compute nodes that together implement a network-based virtual computing service, wherein the network-based virtual computing service comprises a network-based interface configured to provide to the client of the network-based virtual computing service the current resource credit balance for the virtual compute instance over time or applied resource credits for work requests for the virtual compute instance over time.

4. The system of claim 3, wherein the virtual compute instance is one of a plurality of different, types of virtual compute instance offered via the network-based virtual computing service, and wherein each of the different types of virtual compute instance corresponds to a different respective resource credit accumulation rate.

5. A method, comprising:

performing, by one or more computing systems:

receiving, at a virtualization manager for a virtualization host, a work request utilizing one or more virtual computer resources submitted by a virtual compute instance hosted as part of performing an application for a client that reserved the virtual compute instance at the virtualization host;

automatically adding a same number of resource credits, at a resource credit accumulation rate set for the one or more virtual computer resources, to a current resource credit balance for the virtual compute instance respective to the one or more virtual computer resources, wherein:

the current resource credit balance comprises a set of current resource credits that, when used, increase processing time of the one or more virtual computer resources for a time period in excess of a baseline amount of processing time provided by a baseline utilization guarantee; and at least one current resource credit of the current resource credit balance was automatically added to the current resource credit balance from a particular time period prior to the current time period, wherein during the particular time period, the virtualization host had performed one or more prior work requests, submitted by the virtual compute instance as part of performing the application for the client, that utilized a prior amount of processing time not in excess of the baseline amount of processing time provided by the baseline utilization guarantee;

determining that a current amount of processing time to perform the work request for the current time period, submitted by the virtual compute instance as part of performing the application for the client, is in excess of the baseline amount of processing time provided by the baseline utilization guarantee for the current time period, and responsive to the determination:

using the at least one current resource credit, automatically added for the particular time period prior to the current time period, from the current resource credit balance to increase processing time of the respective one or more virtual computer resources for the current time period in excess of the baseline amount of processing time provided by the baseline utilization guarantee for the virtual compute instance;

generating one or more scheduling instructions that schedule the work request for performance at one or more physical computer resources implemented as part of the virtualization host according to the use of the at least one resource credit;

performing the work request utilizing the respective at least one processor of the compute node according to the one or more scheduling instructions; and updating the current resource credit balance for the one virtual compute instance to deduct the at least one resource credit applied to perform the work request.

6. The method of claim 5, further comprising:
wherein said receiving, said determining, said applying, said generating, said performing, and said updating are performed for a plurality of different work requests;
recording, as credit balance metrics, the determined current resource credit balance for each of the plurality of different work requests; and
recording, as credit usage metrics, the applied one or more resource credits for each of the plurality of different work requests.

7. The method of claim 6, further comprising:
receiving a request via a network-based interface for at least some of the credit balance metrics for the virtual compute instance; and
in response to receiving the request, providing the at least some credit balance metrics for the virtual compute instance via the network-based interface.

8. The method of claim 6, further comprising:
receiving a request via a network-based interface for at least some of the credit usage metrics for the virtual compute instance; and
in response to receiving the request, providing the at least some credit usage metrics for the virtual compute instance via the network-based interface.

9. The method of claim 6, further comprising:
monitoring the credit balance metrics or the credit usage metrics for the virtual compute instance;
based, at least in part, on said monitoring, detecting an alarm event for the virtual compute instance; and
in response to detecting the alarm event, providing a notification of the alarm event for the virtual compute instance.

10. The method of claim 5, wherein said generating the one or more scheduling instructions to send to the scheduler comprises:
subsequent to applying the one or more resource credits to the work request:
determining that there is no remaining resource credit in the current resource credit balance to apply to the work request;
in response to determining that there is no remaining resource credit, configuring at least one of the one or more generated scheduling instructions such that utilization of the one or more physical computing resources is incrementally lowered to the baseline utilization for the virtual compute instance.

11. The method of claim 5, wherein the one or more virtual computer resources are one or more virtual central processing units (vCPUs), wherein the one or more physical computer resources are one or more central processing units (CPUs), and wherein the method further comprises sending the one or more scheduling instructions to a scheduler for the one or more physical CPUs.

12. The method of claim 5, wherein said determining the current resource credit balance for the one virtual compute instance comprises excluding, from the current resource credit balance, those unused resource credits accumulated prior to a resource credit accumulation time period.

13. The method of claim 5, wherein the one or more virtual computer resources are some of a plurality of different computer resources, wherein a different respective current resource credit balance is maintained for different ones of the plurality of different computer resources, wherein another work request is received for another one of the plurality of different computer resources, and wherein said determining, said applying, said generating, said performing, and said updating are performed for the other work request.

14. A non-transitory, computer-readable storage medium, storing program instructions that when executed by one or more computing devices cause the one or more computing devices to implement:
receiving, at a virtualization manager for a virtualization host, a work request for one or more virtual computer resources submitted by a virtual compute instance as part of performing an application for a client that reserved the virtual compute instance for the client hosted at the virtualization host;
automatically adding a same number of resource credits, at a resource credit accumulation rate set for the one or more virtual computer resources, to a current resource credit balance for respective consecutive time periods to calculate the current resource credit balance for the virtual compute instance respective to the one or more virtual computer resources, wherein:
the current resource credit balance comprises a set of current resource credits that, when used, increase processing time of the one or more virtual computer resources for a time period in excess of a baseline amount of processing time provided by a baseline utilization guarantee; and
at least one current resource credit of the current resource credit balance was automatically added to the current resource credit balance from a particular time period prior to the current time period, wherein duns the particular time period, the virtualization host had performed one or more prior work requests, submitted by the virtual compute instance as part of performing the application for the client, that utilized a prior amount of processing time not in excess of the baseline amount of processing time provided by the baseline utilization guarantee;
determining that a current amount of processing time to perform the work request for the current time period, submitted by the virtual compute instance as part of performing the application for the client, is in excess of the baseline amount of processing time provided by the baseline utilization guarantee for the current time period, and responsive to the determination:
using the at least one current resource credit, automatically added for the particular time period prior to the current time period, from the current resource credit balance to increase the current amount of processing time of the respective one or more virtual computer resources for the current time period in excess of the amount of processing time provided by the baseline utilization guarantee for the virtual compute instance;
generating one or more scheduling instructions that schedule the work request for performance utilizing at one or more physical computer resources implemented as part of the virtualization host, according to the use of the at least one resource credits;
performing the work request utilizing the one or more physical computer resources according to the one or more scheduling instructions; and
updating the current resource credit balance for the one virtual compute instance to deduct the at least one resource credit applied to perform the work request.

15. The non-transitory, computer-readable storage medium of claim 14, wherein the program instructions cause the one or more computing devices to further implement:
 wherein said receiving, said determining, said applying, said generating, said performing, and said updating are performed for a plurality of different work requests;
 recording, as credit balance metrics, the determined current resource credit balance for each of the plurality of different work requests; and
 recording, as credit usage metrics, the applied one or more resource credits for each of the plurality of different work requests.

16. The non-transitory, computer-readable storage medium of claim 15, wherein the program instructions cause the one or more computing devices to further implement:
 monitoring the credit balance metrics or the credit usage metrics for the virtual compute instance;
 based, at least in part, on said monitoring, detect an alarm event for the virtual compute instance; and
 in response to detecting the alarm event, providing a notification of the alarm event for the virtual compute instance.

17. The non-transitory, computer-readable storage medium of claim 14, wherein the one or more virtual computer resources are one or more networking resources and wherein the one or more physical computer resources are one or more network communication devices.

18. The non-transitory, computer-readable storage medium of claim 14, wherein, in said generating the one or more scheduling instructions to send to the scheduler, the program instructions cause the one or more computing devices to implement:
 subsequent to applying the one or more resource credits to the work request:
 determining that there is no remaining resource credit in the current resource credit balance to apply to the work request;
 in response to determining that there is no remaining resource credit, configuring at least one of the one or more generated scheduling instructions such that utilization of the one or more physical computer resources is incrementally lowered to the baseline utilization for the virtual compute instance.

19. The non-transitory, computer-readable storage medium of claim 14, wherein, in said determining the current resource credit balance for the virtual compute instance, the program instructions cause the one or more computing devices to implement excluding, from the current resource credit balance, those unused resource credits accumulated prior to a resource credit accumulation time period.

20. The non-transitory, computer-readable storage medium of claim 14, wherein the virtualization host is implemented as part of a network-based virtual computing service, wherein the one virtual compute instance is one of a plurality of different types of virtual compute instance offered via the network-based virtual computing service, and wherein each of the different types of virtual compute instance corresponds to a different respective resource credit accumulation rate.

* * * * *